(12) United States Patent
Romanski

(10) Patent No.: US 7,261,547 B2
(45) Date of Patent: Aug. 28, 2007

(54) POST MOLD COOLING AND PARTS RETRIEVAL APPARATUS

(75) Inventor: Zbigniew Romanski, Mississauga (CA)

(73) Assignee: Husky Injection Molding System Ltd, Bolton, Ontario (CA)

( * ) Notice: Subject to any disclaimer, the term of this patent is extended or adjusted under 35 U.S.C. 154(b) by 335 days.

(21) Appl. No.: 11/005,273

(22) Filed: Dec. 6, 2004

(65) Prior Publication Data

US 2006/0121151 A1    Jun. 8, 2006

(51) Int. Cl.
*B29C 45/40* (2006.01)
*B29C 35/16* (2006.01)

(52) U.S. Cl. .............. 425/436 RM; 425/444; 425/558

(58) Field of Classification Search ........ 425/436 RM, 425/444, 537, 556, DIG. 38
See application file for complete search history.

(56) References Cited

U.S. PATENT DOCUMENTS

| | | | |
|---|---|---|---|
| 3,804,568 A | 4/1974 | Rees | |
| 3,981,673 A | 9/1976 | Sokolow | |
| 4,412,806 A * | 11/1983 | Gaiser et al. | 425/554 |
| 4,729,732 A | 3/1988 | Schad et al. | |
| 4,824,359 A | 4/1989 | Poehlsen | |
| 4,836,767 A | 6/1989 | Schad et al. | |
| RE33,237 E | 6/1990 | Delfer, III | |
| 5,297,950 A | 3/1994 | Kresak | |
| 5,354,194 A | 10/1994 | Kresak | |
| 5,447,426 A | 9/1995 | Gessner et al. | |
| 5,470,221 A * | 11/1995 | Gaiser | 425/556 |
| 6,171,541 B1 | 1/2001 | Neter et al. | |
| 6,176,699 B1 | 1/2001 | Franjo et al. | |
| 6,391,244 B1 * | 5/2002 | Chen | 264/336 |
| 6,432,351 B1 | 8/2002 | Ogihara | |
| 7,104,779 B2 * | 9/2006 | Howlett | 425/534 |
| 2003/0107155 A1 | 6/2003 | Olaru | |
| 2004/0185136 A1 | 9/2004 | Domodossola et al. | |

FOREIGN PATENT DOCUMENTS

| | | |
|---|---|---|
| CA | 2504954 A1 | 7/2004 |
| EP | 1215031 A1 | 6/2002 |

OTHER PUBLICATIONS

International Search Report for PCT/CA2005/001598, dated Feb. 1, 2006, three pages, related to the above-identified US patent application.

* cited by examiner

*Primary Examiner*—Duane Smith
*Assistant Examiner*—Emmanuel S Luk

(57) ABSTRACT

Platen-mounted, post-mold cooling apparatus and method includes structure and/or steps for handling molded parts in an injection molding machine having a fixed platen, a moving platen, a core half, and a cavity half. A take off device coupled to the fixed platen is configured to remove molded parts from either the core half or the cavity half. A cooling device coupled to the moving platen is configured to cool the molded parts carried by the take off device. Preferably, the take off device extracts the just molded parts from the mold's core half and then moves linearly outboard of the mold halves. The subsequent movement of the moving platen to close the mold in the next molding cycle causes the cooling device's pins to engage the molded parts in the take off device part carriers. When the moving platen opens again, the molded parts are extracted from the part carriers by external gripping devices. When the moving platen is fully open, the cooling device is rotated to eject the cooled parts from the machine.

13 Claims, 12 Drawing Sheets

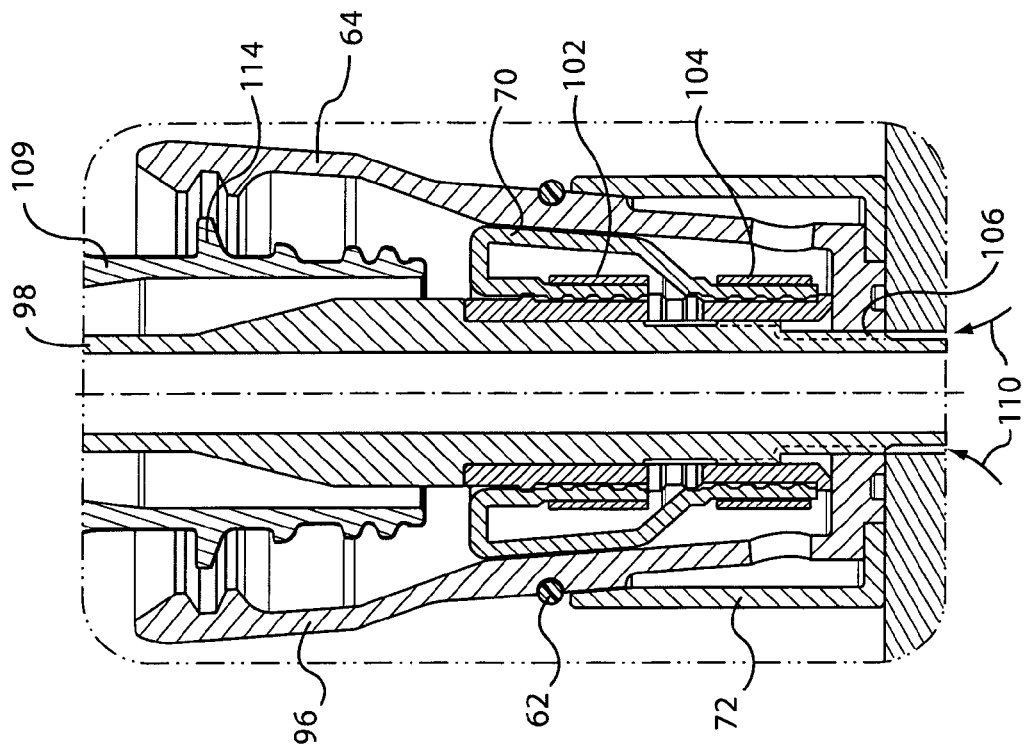
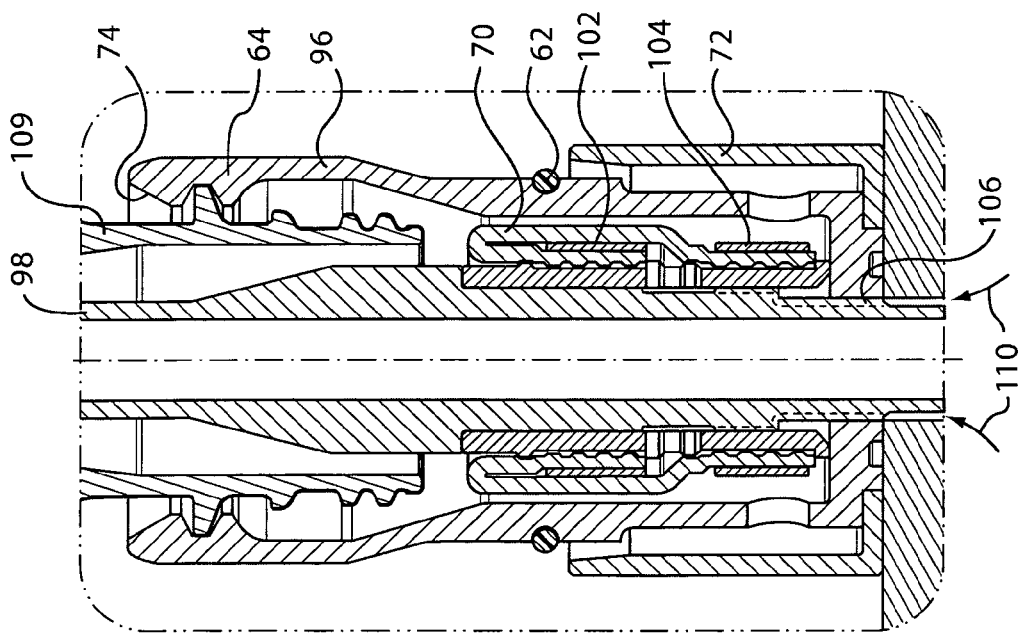

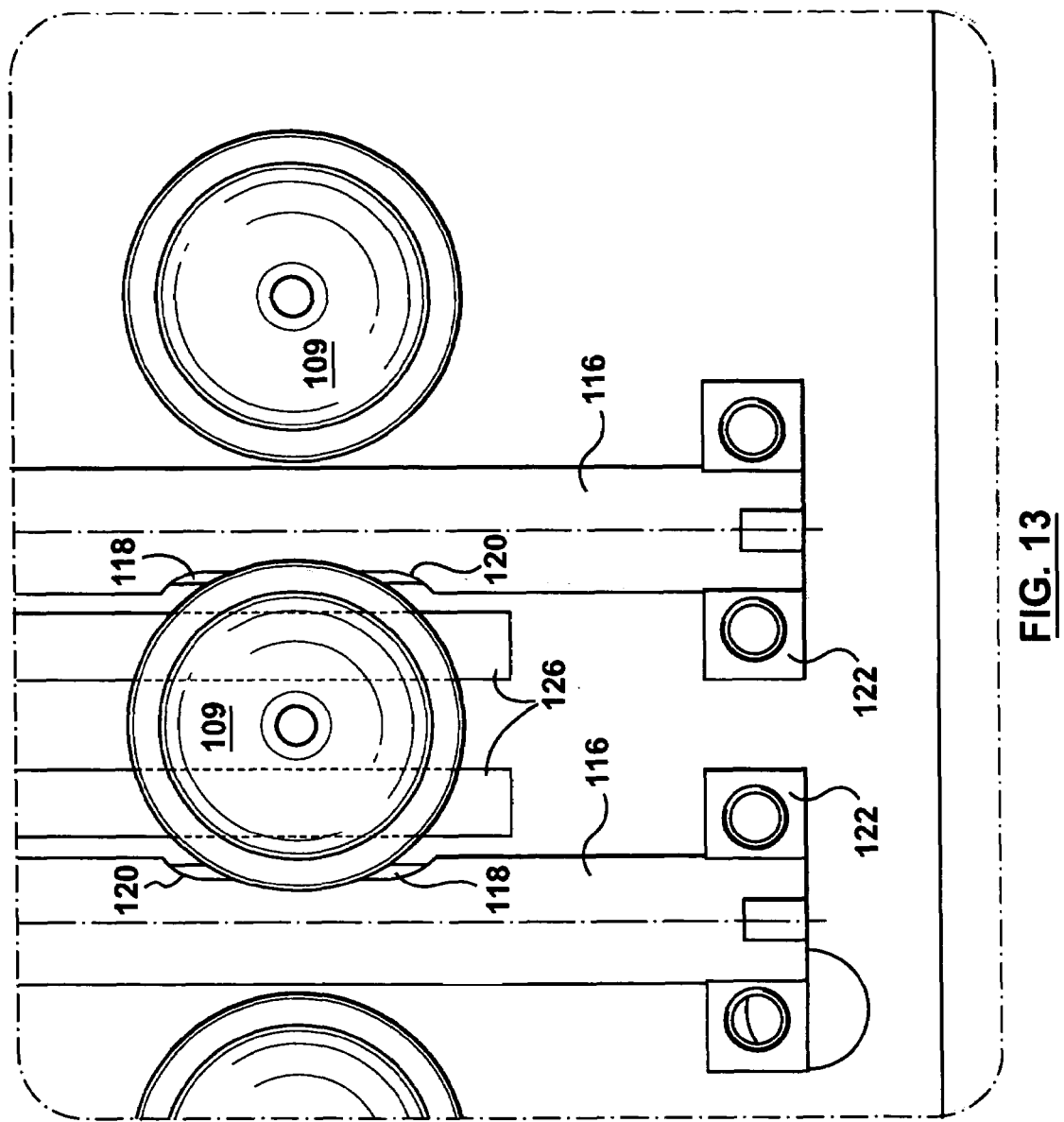

POST MOLD COOLING AND PARTS
RETRIEVAL APPARATUS

TECHNICAL FIELD

The present invention relates to a method and apparatus for removing molded plastic articles from a take out plate after the molding operation is finished. In particular, the present invention relates to method and apparatus for an injection molding machine equipped with a post mold device mounted on a moving platen that cooperates with a multi-position robot take out plate to selectively unload some of the molded part carriers on the multi-position take out plate using grippers that grasp an external surface of the articles. The method and apparatus are particularly well suited for molded thermoplastic polyester polymer materials, such as polyethylene terephthalate ("PET") preforms.

BACKGROUND OF THE INVENTION

A variety of post mold preform transfer methods are currently employed on injection molding machines to optimize the cycle time of the molding machine. Some parts (for example plastic preforms) are typically injection-molded using PET resin, and can have a wall thickness varying from about 2.00 mm to greater than 4.00 mm, and require extended cooling periods to solidify into substantially defect-free parts. Heavy walled parts (such as those made from a material that has a high resistance to thermal heat transfer, like plastic resin) can exhibit "reheating" phenomena that can produce defective parts after they have been ejected from the mold.

Several techniques are employed to perform a post mold cooling function, wherein partially cooled preforms are ejected from the injection mold after an initially cooled surface skin has formed to allow the part to be ejected without deformation. The partially cooled preforms are then handed off to a downstream device that continues to hold the preform while removing the remaining heat so that the preform can subsequently be handled without damage. Typically, the preform surface temperature needs to be lowered to about 70° C. to ensure safe handling.

The early ejection of partially cooled preforms releases the injection molding equipment earlier in the molding cycle, thereby significantly improving the production efficiency of the equipment. The apparatus for removing the hot molded part from the take-off plate must handle the hot preform without damaging it.

U.S. Pat. No. Re. 33,237 discloses a robotically-controlled multi-position take out plate for removing partially cooled injection molded parts from the core side of an injection mold. The parts are ejected from the mold directly into cooled carriers, as disclosed in U.S. Pat. No. 4,729,732, and transported by the robot to an outboard position where some of the parts are ejected onto a conveyor. The plate has multiple sets of carriers, each set being sufficient in number to hold one part from each of the cores of the multi-cavity mold. There are multiple sets of carriers on the plate so that multiple sets of molded parts can be held and cooled, the set that is ejected being the set that has been cooling the longest in the tubes of the plate. The disclosed method of ejecting the parts relies on the termination of a vacuum that is holding the parts in the carriers, thereby allowing gravity to cause the parts to fall out when the take out plate has been rotated 90 degrees to a discharge position. Without a positive ejection force, parts can stick in the tubes and cause jamming of the machine.

U.S. Pat. No. 5,447,426 teaches unlocking preforms by using ejector bars.

U.S. Pat. No. 6,171,541 discloses inserting a cooling pin into the interior of a partially cooled part to discharge a cooling fluid therein to assist cooling. Also disclosed is a procedure to apply a vacuum through the same cooling pin to cause the part to remain attached to the pin when it is moved away from the carrier holding the part, thereby removing the part from the carrier. The pins, mounted to a frame, are then rotated 90 degrees to a discharge position and the vacuum terminated to allow the parts to fall off the pins. There is no disclosure of grippers for grasping an external surface of the parts to hold and transport a part.

U.S. Pat. No. 4,836,767 discloses a rotatable table mounted on the moving platen on which is mounted two core sets for the mold. While one core set is in the closed mold position for injection molding parts, the other is positioned outboard for ejecting the parts into cooled carriers that are mounted on an indexable, four-sided carousel that is mounted to the stationary platen of the machine. Four sets of molded parts can be carried on the carousel allowing an extended cooling time to be performed. The parts remain on the cores for one additional cycle time sequence that provides a small extension of cooling time of the interior of the parts before they are transferred to the carousel.

U.S. Pat. No. 3,804,568 discloses a robot mounted to the moving platen of an injection molding machine, wherein the robot drives a take out plate into and out of the open mold area to remove ejected parts. A second transfer plate then unloads the take out plate while it is in the outboard position. The motion of the moving platen is used, via cams and linkages, to actuate the take out plate vertical motion and to synchronize it mechanically so that there is no risk of collision with the mold during its operation.

U.S. Pat. No. 5,354,194 discloses a molded part removal unit mounted to the side of the fixed platen.

An earlier Husky preform molding system used a robot with a single position take out plate with carriers to unload PET preforms. The robot was mounted on the stationary platen and moved the take out plate vertically. In the outboard position, above the mold, a vacuum tube carrier of a transfer plate was aligned with the carriers and removed the molded parts therefrom by application of vacuum to their interiors. The transfer plate moved to a second outboard position at the non-operator side of the machine and rotated to allow the parts to drop from the tubes when the vacuum was terminated.

Copending Husky U.S. published application 2004/0185136 published Sep. 23, 2004 describes a molded part handling apparatus for an injection molding machine having a fixed platen and a moving platen. A take off device is coupled to the fixed platen and configured to remove molded parts from between the fixed platen and the moving platen. A cooling device is coupled to the moving platen and configured to cool the molded parts carried by the take off device.

SUMMARY OF THE INVENTION

According to a first aspect of the present invention, structure and/or steps are provided for a molded part handling apparatus for an injection molding machine having a fixed platen, a moving platen, a core half, and a cavity half. A take off device is coupled to the fixed platen and is configured to remove molded parts from one of the core half and the cavity half. A cooling device is coupled to the moving platen and is configured to cool the molded parts carried by the take off device and remove the parts from the take-off device by grasping an external surface of the molded part.

According to another aspect of the present invention, structure and/or steps are provided for a molded part transfer apparatus for an injection molding machine having a core half and a cavity half. A take off device is configured to remove molded parts from one of the core half and the cavity half. A cooling device is configured to cool the molded parts carried by the take off device. Movement control structure is configured to cause: (i) simultaneous relative movement of the core half toward the cavity half, and the cooling device toward the take off device; and (ii) simultaneous relative movement of the core half away from the cavity half, and the cooling device away from the take off device and removal of some of the parts from the take-off device by grippers grasping external surfaces of some of the parts in the take off device.

The invention also provides apparatus for transferring a molded part from a mold take-out plate to a cooling plate. The apparatus comprises a gripping device for gripping an external surface of the part and a device for preventing the gripping device from gripping the part.

The invention further provides a gripping device for gripping a molded preform. The gripping device has a plurality of flexible fingers. The flexible fingers have an internal surface conforming at least in part to a portion of an external surface of the preform. The fingers are flexed into an open position for receiving the preform and released to collapse into gripping engagement with the preform at the surfaces when the preform is received within the fingers.

The invention further provides a gripping device for gripping molded preforms that includes a pair of solid tubes. Each tube has a cutout portion at each preform gripping position. An inflatable bladder extends along the interior of each tube. Each bladder is expandable outside the tube at each gripping position when inflated to grasp an outer surface of each preform in each gripping position.

Thus, the present invention advantageously provides post-mold cooling method and apparatus for efficiently cooling and transferring molded plastic pieces.

BRIEF DESCRIPTION OF THE DRAWINGS

Exemplary embodiments of the present invention will now be described with reference to the accompanying drawings in which:

FIGS. 9A and 9B are sectional views of an alternative embodiment of a preform gripper mechanism in the closed and open positions.

FIG. 13 is a plan view of the embodiment shown in FIG. 12.

DETAILED DESCRIPTION OF THE PREFERRED EMBODIMENTS

The present invention will now be described with respect to several embodiments in which a plastic injection molding machine has a cooling device fixed to the movable platen, and a take off device fixed to the fixed platen. In a preferred embodiment, the cooling device has a plurality of cooling tubes and a lesser number of external grippers, and the take off device has a plurality of preform carriers. After the movable platen is moved to open the mold, the take off device moves linearly in between the mold halves to extract the freshly molded preforms from the mold cores onto the preform carriers. The take off device is then moved linearly to a position outboard of the mold halves. Then, when the movable platen moves toward the fixed platen to close the mold and mold a new set of preforms, the cooling device moves simultaneously to engage the take off device carriers with the cooling pins and transfer grippers. When the moving platen again moves to open the mold, a group of preforms from the carriers are extracted by a gripper means onto the cooling device. By the time the moving platen has reached its fully open position, the cooling device has rotated about a horizontal axis to drop the molded and cooled parts onto a conveyor.

Preferably, the cooling device includes cooling pins that are inserted into each preform on the take out device each time the cooling device approaches the take out device. The cooling air is injected to the interior tip of the preform and flows down the inside surface of the preform to the outside.

Figure 1:
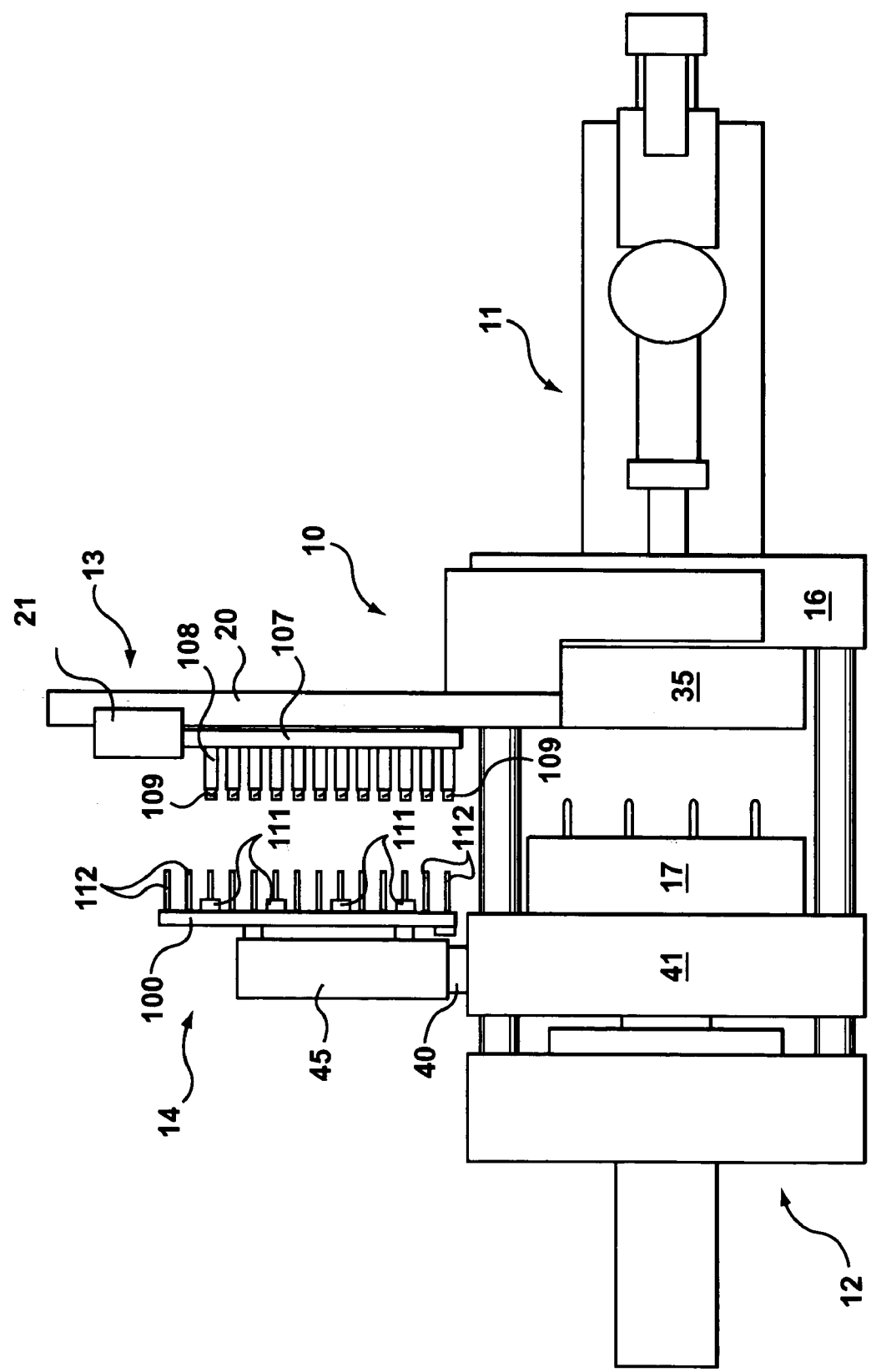
FIG. 1 is a plan view of an embodiment of the present invention showing a multi-position take out plate at an outboard position with a multiple cooling device with part grippers.

With reference to FIG. 1, a top plan view of an injection molding machine 10 is shown comprising, an injection unit 11, a clamp unit 12, a robot unit 13, and a transfer device 14. Also included is an injection mold comprising two halves: (i) the cavity half 35, containing mold cavities (not shown), attached to the stationary platen 16 of the machine 10; and (ii) the core half 17 which is attached to the moving platen 41 of the machine 10.

The robot unit 13 is mounted on the stationary platen 16 and includes a horizontal "Z" beam 20 that projects to the non-operator side of the machine and upon which rides a carriage 21, moved along the beam by (typically) a servo-electric driven belt drive (not shown). Multi-position plate 107 is attached to the carriage 21. Multiple sets of carriers 108 are mounted on plate 107 and may be cooled for transporting multiple molded shots of parts ejected from the mold from an inboard (loading) position (not shown).

The transfer device 14 includes a cooling plate 100 upon which are mounted multiple cooling pins 112. A hollow structure 45 attaches the plate 100 to the hollow cylinder 40, and allows services to be carried from the machine through the structure 45 to the plate 100. By virtue of this lightweight construction and the fact that the transfer device carries only one molded shot of parts at any one time, the plate 100 can be rotated very quickly through a 90-degree arc by any suitable means. For example, the rotation of the plate 100 can be effected by an electric drive (not shown) mounted to the hollow structure 45.

In operation, one shot of molded parts is transferred into the carriers 108 when the mold is open and the multi-position take off plate 107 is positioned such that empty carriers are aligned with parts on the mold cores. In the example shown in FIG. 1, a 32-cavity mold is transferring 32 parts into 32 carriers on a 3 position take off plate 107. The multi-position take off plate 107 is then moved to its outboard position by the robot 13, as shown in FIG. 1. The mold is then closed and clamped for the next molding cycle. Meanwhile, as the mold closes, the transfer device 14 moves the plate 100 and its grippers 111 as to grasp one third or 32 of the parts 109 held in the carriers 108. At the same time, a cooling pin 112 enters each of the 96 parts 109 held by the carriers 108.

When the molding cycle ends and the mold opens, the grippers extract one third or, in this case, 32 of the parts 109 from the carriers 108 on the plate 107. The plate 100 is then rotated 90 degrees and the parts held by the grippers 111 are dropped onto a conveyor beneath (not shown). The remaining parts continue to be held in their carriers 108 by vacuum.

The multi-position take off plate 107 preferably has multiple sets of carriers 108 mounted to it which hold the molded parts by vacuum. Preferably, there are 3 sets of carriers (numbering 32 in each set in this example) so that three molding shots of parts (96 in total) from the 32-cavity mold can be carried at any one time on the multi-position take off plate 107.

The transfer device 14 is mounted on the hollow cylinder 40 on the side of the movable platen 41. The transfer device 14 can rotate about a (preferably only a single axis) horizontal axis through 90 degrees. The plate 107 is made of lightweight aluminum, or similar material, and carries cooling pins sufficient in number to exceed the number of carriers 108 on the multi-position carrier plate 107 by a number equivalent to two rows of carriers 108.

FIG. 1 shows a conditioning plate 100 on which an additional two rows of cooling pins 112 have been mounted. Rows of gripping devices 111 are provided with every third row of cooling pins 112. This example of tube layout is suitable for operation with a three position multi-position take out plate 107.

Figure 2A:
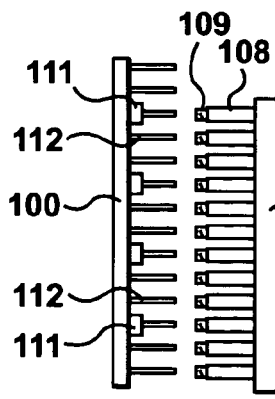
FIGS. 2a, 2b, and 2c comprise plan views of the FIG. 1 embodiment showing the multi-position take out plate at the first of the three outboard positions with the multiple cooling device shown in three positions: prior to engagement 2a; engaged 2b; disengaged with selected parts removed 2c.
Figure 2B:
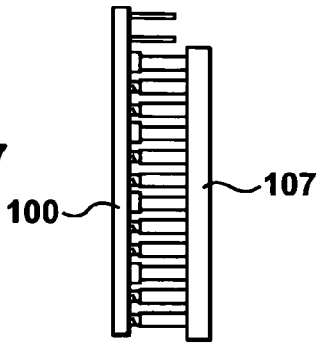
Figure 2C:
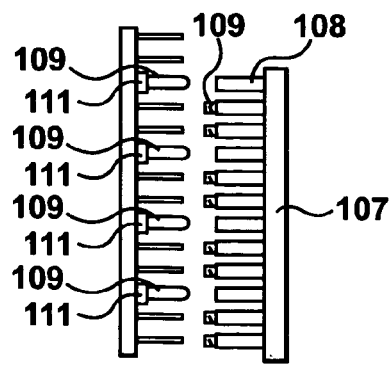

FIGS. 2a,2b,2c; 3a,3b,3c; and 4a,4b,4c; in combination, show a complete sequence of operations of the multi-position take out plate to cool and remove the parts 109 in the carriers 108. FIG. 2a shows the multi-position take out plate 107 in the first of its three outboard positions in which a molded part 109 is aligned with grippers 111 on the plate 100. Every third position has a gripper 111 to grip and remove parts 109 from the take out plate 107. Each cooling tube 112 on the plate 100 is, preferably, continually discharging cooling fluid even when the tubes 112 are not inside the parts as shown in FIGS. 2b, 3b and 4b. Each of the molded parts 109 is aligned with a corresponding cooling tube 112. FIG. 2b shows the plate 100 engaged with the parts 109 allowing cooling to take place. FIG. 2c shows the plate 100 disengaged from the take out plate 107 with grippers 111, to be more fully described hereinafter, removing selected parts 109 from carriers 108. The parts being removed comprise the molding set that has been in the carriers the longest. The grippers 111 subsequently release these parts. The grippers 111 grasp an external surface of the part 109 and the tubes 112 continue to cool the parts 109 while held in the grippers 111.

Figure 3A:
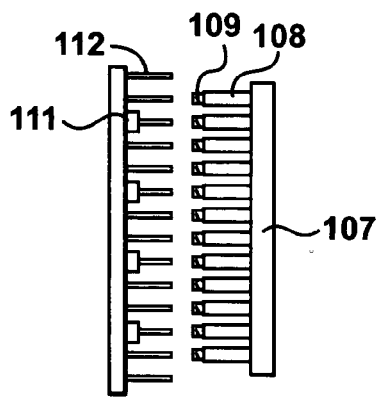
FIGS. 3a, 3b, and 3c comprise plan views of the FIG. 1 embodiment showing the multi-position take out plate at the second of the three outboard positions with the multiple cooling device shown in three positions: prior to engagement 3a; engaged 3b; disengaged with selected parts removed 3c.
Figure 3B:
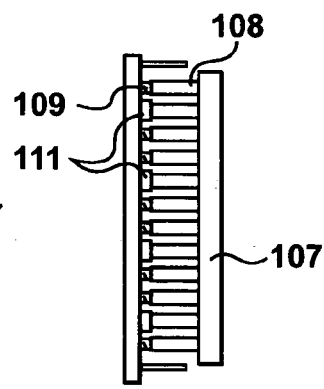
Figure 3C:
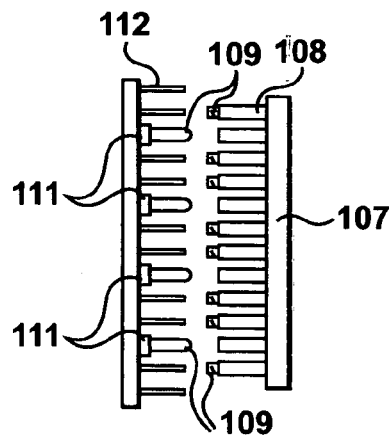

FIG. 3a shows the second outboard position of the multi-position take out plate 107 in which the set of molded parts that has been on carriers 108 the longest is aligned with the same grippers 111. FIGS. 3b and 3c show the remaining steps in the portion of the complete sequence in which all the parts are cooled and transferred.

Figure 4A:
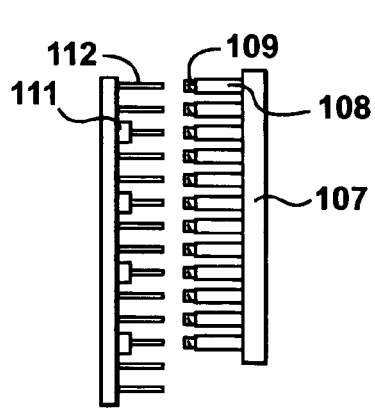
FIGS. 4a, 4b, and 4c comprise plan views of the FIG. 1 embodiment showing the multi-position take out plate at the third of the three outboard positions with the multiple transfer device shown in three positions: prior to engagement 4a; engaged 4b; disengaged with selected parts removed 4c.
Figure 4B:
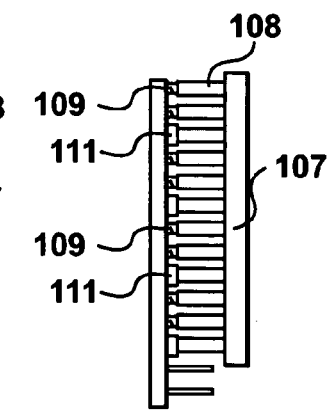
Figure 4C:
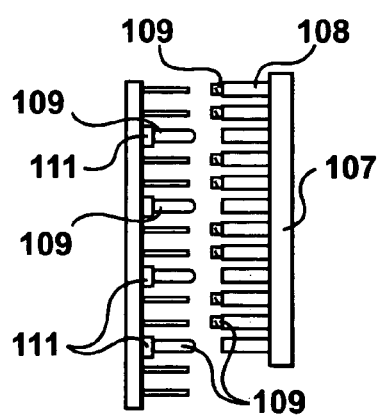

FIG. 4a shows the third outboard position of the multi-position take out plate 107 in which the next, third molding shot of molded parts are again aligned with the same grippers 111. FIGS. 4b and 4c show the remaining steps in which the parts that have been in the carriers for the previous two segments of the sequence receive a further cooling prior to being removed from their tubes 108 as shown in FIG. 4c. Thus, in the complete sequence, the parts 109 are cooled three times before being removed from their carriers 108 by grippers 111.

Obviously, several multi-position take out plate configurations can be provided having greater or lesser numbers of carriers corresponding to the number of parts produced by a variety of multiples of molding shots, and correspondingly the multiple cooling and gripping device can be configured to match such variations so as to optimize the cooling and removal processes provided to the parts.

Figure 5A:
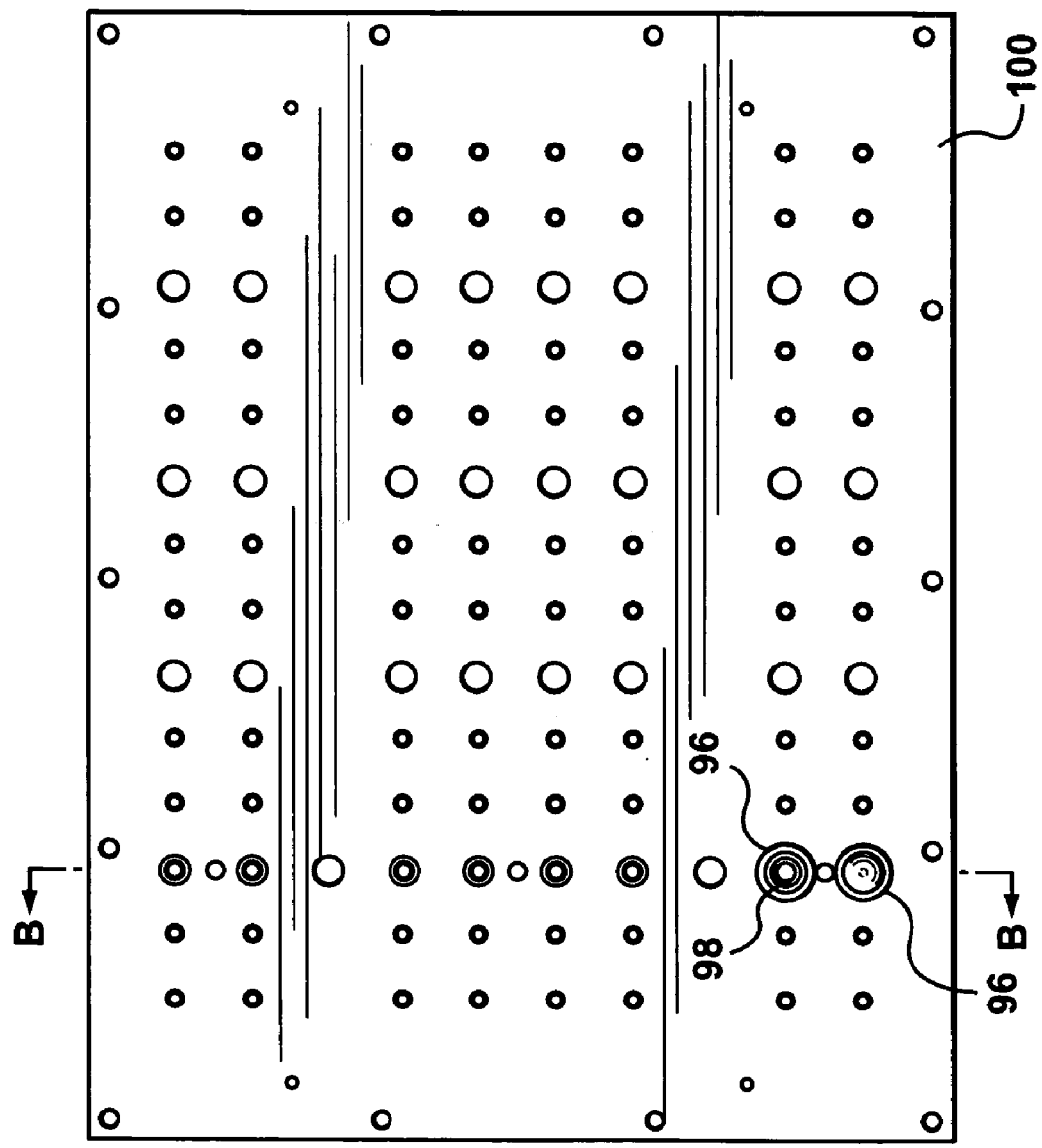
FIG. 5A is a plan view of a partially assembled multiple transfer device.
Figure 5B:
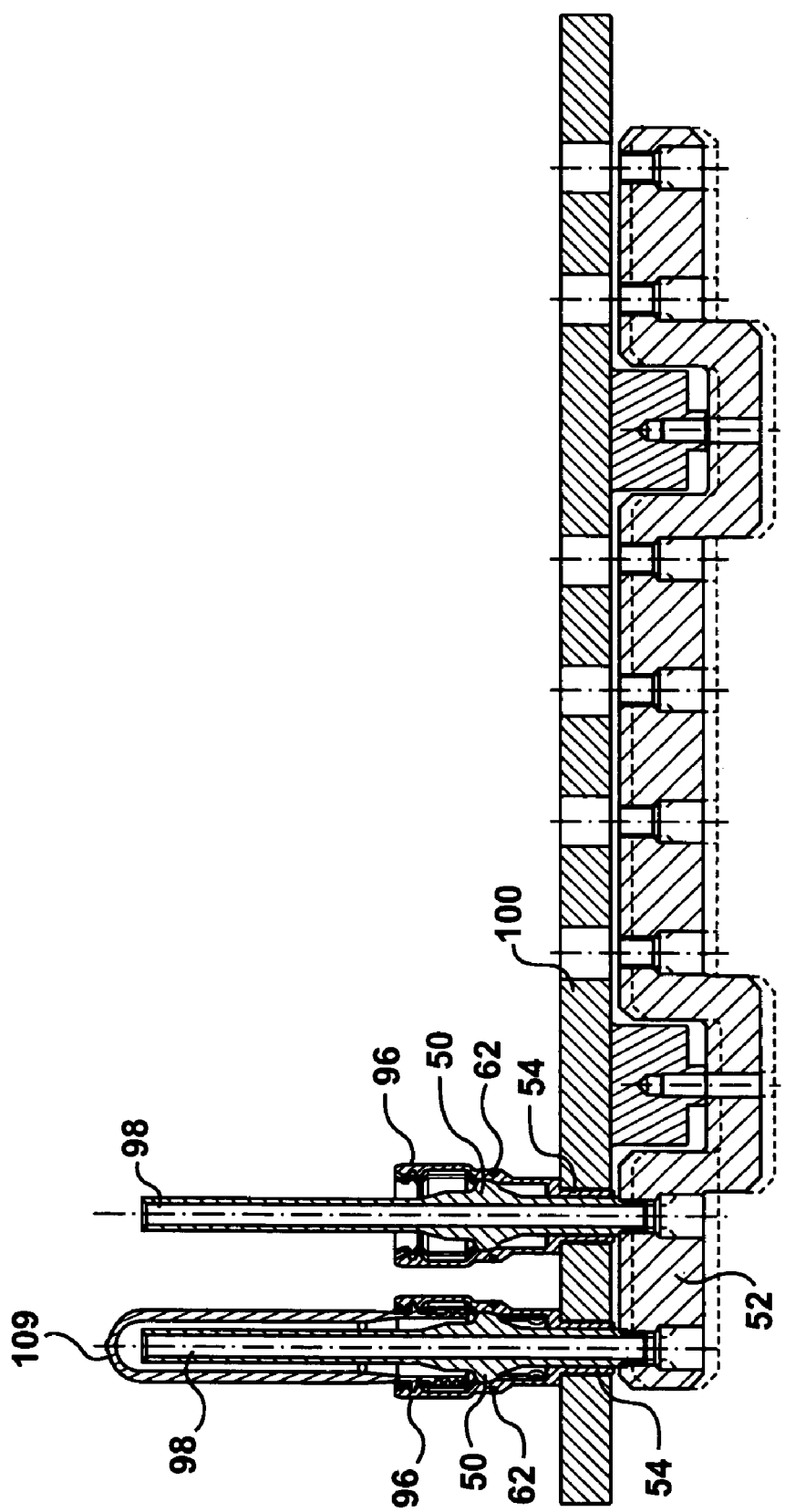
FIG. 5B is a sectional view of the device of FIG. 5A along the sectional line B-B.

A first preferred embodiment of the gripping device will now be described with reference to FIGS. 5A, 5B, 6A, 6B, 7 and 8. As shown in FIG. 5A, the plate 100 includes a plurality of columns and rows for receiving and cooling molded parts. In this configuration, every third column includes a gripping device 96 (only one shown). Every column would include a cooling tube 98 (only two shown) but only those columns with gripping devices 96 would actually grasp and hold parts. As indicated previously, the cooling tubes 98 are carrying cooling fluid at all times, however, they only effectively cool the molded parts when the mold is closed and the transfer device 14 with plate 100 positions the cooling tubes 98 inside the molded parts 109 held in the carriers 108 or when the gripping device 96 is gripping a molded part 109. When the mold opens, the grippers 96 grasp the parts 109 in those columns aligned with the grippers 96 as more fully described hereinbefore with reference to FIGS. 2a to 4c. The cooling and picking plate 100 consists of 12 columns and 8 rows. This enables the plate 100 to cool 96 parts 109 on the multi-position plate 107 while the four rows of grippers 96 align with and grip 32 of the molded parts for subsequent removal from the carriers 108 on the multi-position plate 107. The parts grasped by the grippers 96 continue to be cooled by cooling tubes 98 associated with the grippers 96 as the cooling air flows continuously through the tubes 98 independently of the position of the plate 100.

Figure 6A:
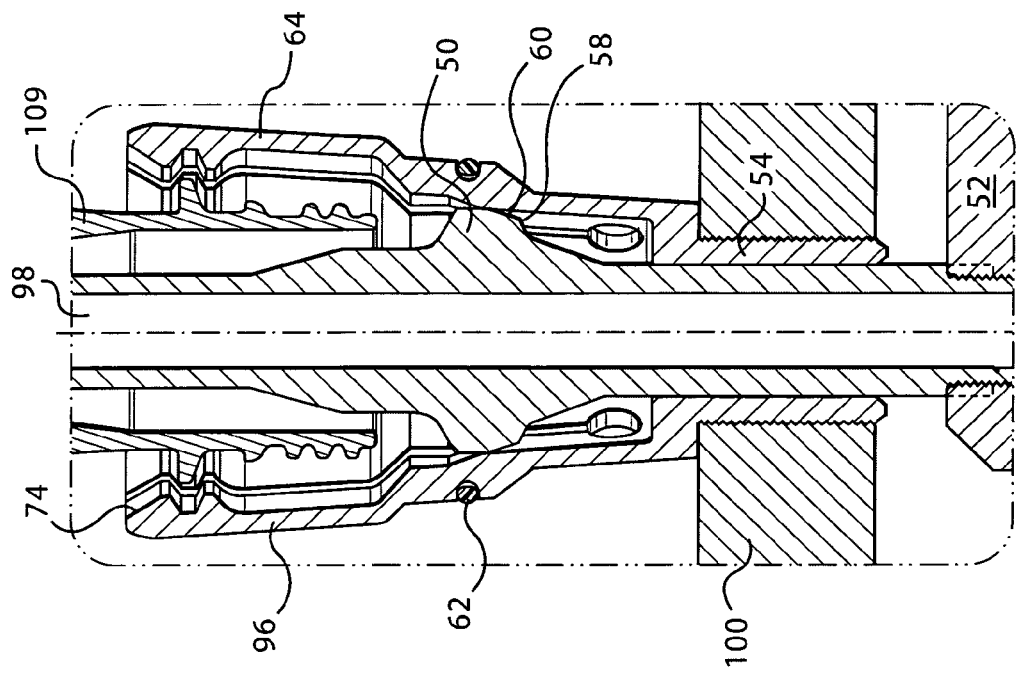
FIG. 6A is a side sectional view of a preferred embodiment of a preform gripper mechanism gripping a part.
Figure 6B:
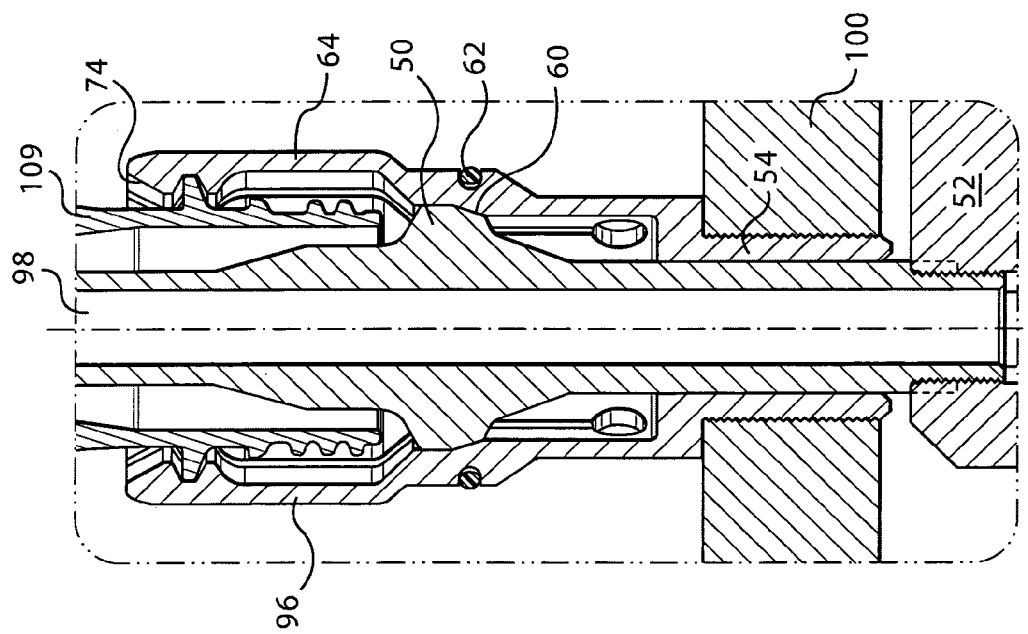
FIG. 6B is a side sectional view of the preferred embodiment of FIG. 6A with the gripper mechanism in a releasing or open position.

As shown in FIGS. 6A and 6B, a detent member 50 is associated with each gripper 96 and is operable to open and close the grippers 96 in response to movement of the bar 52. Bar 52 may be operated by a pneumatic cylinder 54 or other suitable mechanism.

In FIG. 6A, the grippers 96 are shown in the closed position. Movement of the bar 52 causes the detent member 50 to slide in a sliding bearing 54 in gripper 96. When the detent member 50 moves upwards as shown in FIG. 6A, the shoulder 58 on the detent member 50 fully engages the inner surface 60 on the gripper 96 to permit the spring 62 and the natural resiliency of the gripper fingers 64 to close the fingers 64 and grasp the part 109. Retracting the detent member 50 moves the shoulder 58 into contact with a raised portion of the inner surface 60 and forces the resilient fingers 64 into an open or part releasing position as shown in FIG. 6B.

The spring 62 ensures that the fingers 64 of the gripper cannot overextend into an adjacent region and interfere with the transfer or cooling of an adjacent part.

Figure 7:
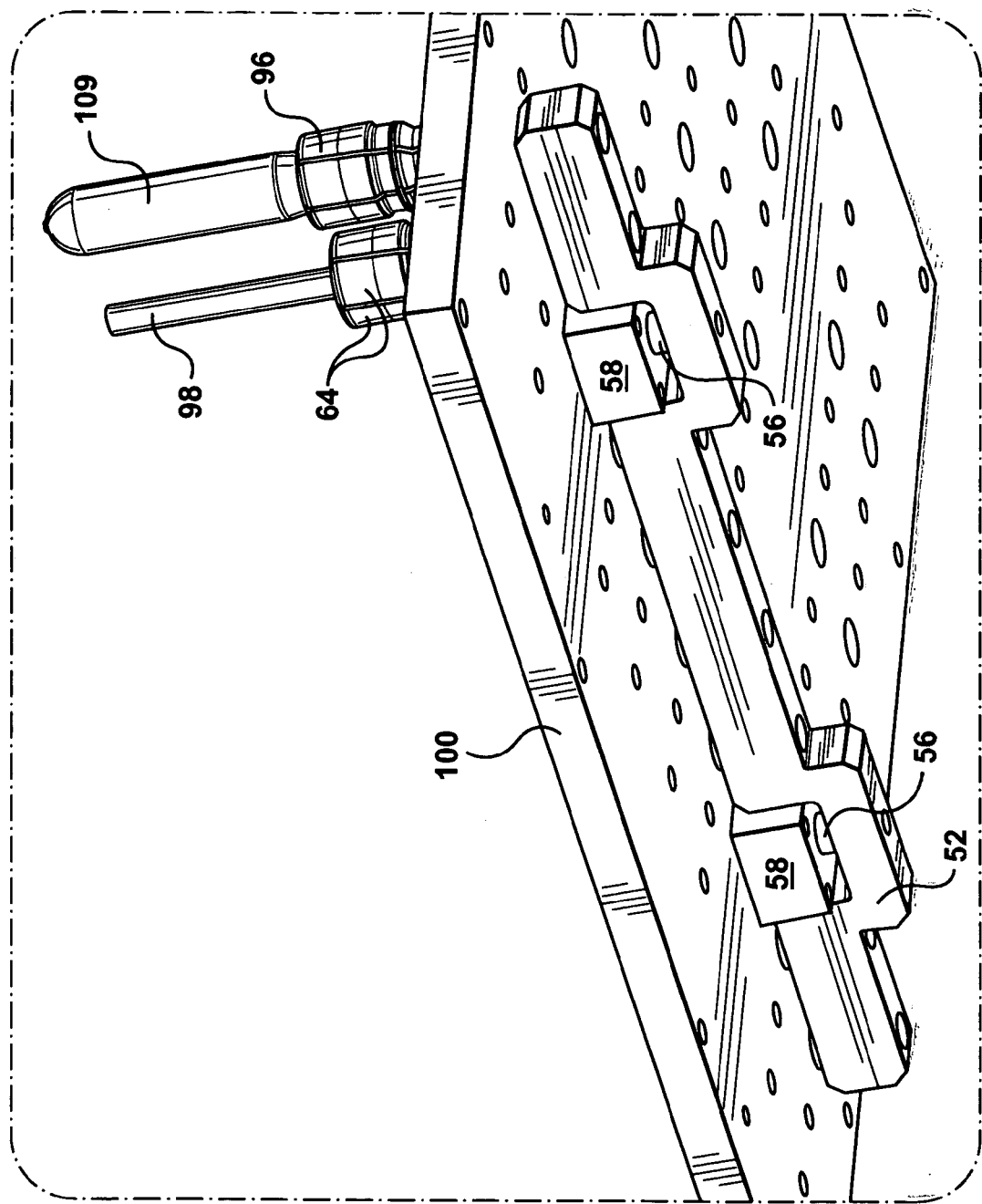
FIG. 7 is an isometric view of the partially assembled device of FIG. 5A showing the mechanism for shifting the gripping device shown in FIGS. 6A and 6B between the open and closed positions.

The sliding bearings 54 in the plate 100 permit the detent 50 to slide back and forth. Each detent 50 is firmly attached to the bar 52. As shown in FIG. 7, pistons 56 connected to air cylinders 58 drive each bar 52. FIG. 7 shows the bar 52 in the raised position to cause the detents 50 to close the grippers 96 around a part 109.

In the event that the grippers 96 should fail to open when the plate 100 moves into position with the multi-position plate 107, the tapered surface 74 would engage the lip of the part 109 and thereby force the fingers 64 to open. When the plate fully engages with the plate 107, the fingers 64 will return to the closed position gripping the part 109 as shown in FIG. 6A. Of course, if the detent member 50 cannot open the gripper 96, the part 109 would have to be removed manually from the gripper 96 before the gripper could be used to grip another part. However, the failure would not interfere with the operation of the mold and cannot cause any catastrophic failure of the molding operation.

Figure 8:
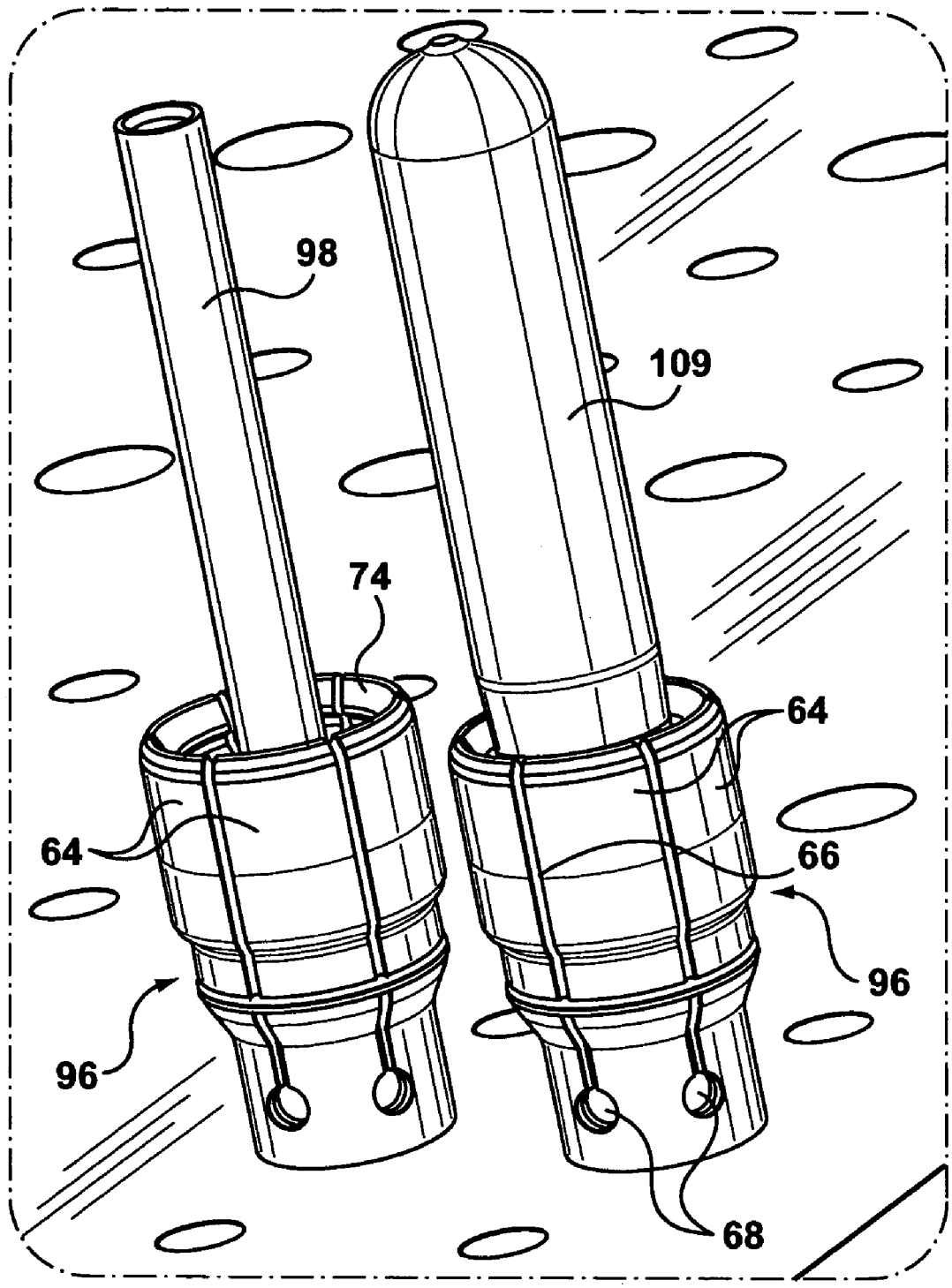
FIG. 8 is an isometric view of the gripping device of FIGS. 6A and 6B when holding a preform and when empty of a preform.

As shown in FIG. 8, the preferred construction of the gripper 96 has 6 flexible fingers 64 that are formed by creating long slits 66 along the length of the gripper 96. Forming openings 68 at the base of each finger 64 further increases the flexibility of the fingers 64.

A suitable material for the gripper 96 has been found to be a synthetic resinous plastic material sold by Du Pont de Nemours under the trade mark Delrin. This material has the strength to withstand many flexing operations and retain its flexibility so that the gripper operates satisfactorily for long periods.

It should be noted that with this design of the gripper 96, if a failure does occur, the gripper will retain the part and not release it inappropriately because the gripper 96 fails safe in the closed rather than the open position.

FIGS. 9A and 9B illustrate a further embodiment of a gripper. In this embodiment the gripper 96 is unchanged from the gripper described with reference to FIGS. 6 to 8. However, the actual operation of the gripper 96 is modified. In this embodiment, a bladder 70 is inflated to open the gripper 96. When deflated, the bladder 70 permits the gripper 96 to be in the part grasping position to grasp a part 109 along the support ledge 114. A cup 72 surrounds the base of the gripper 96. The cup 72 prevents the gripper 96 from extending outside its part-capturing zone and into an adjacent part zone if the bladder 70 should over inflate as a consequence of a failure in the air supply lines to the bladders 70.

The bladder 70 is held in place against the cooling tube 98 by sleeves 102 and 104. An air channel 106 (shown in dotted lines) along the cooling tube 98 receives air from the supporting plate as shown by the arrows 110. When air is supplied to the channels 106, the bladder 70 inflates and when the air pressure is removed, the natural resiliency of the fingers 64 of the gripper 96 deflates the bladder 70. If the fingers 64 should become less flexible, the spring 62 can assist in the deflation of the bladder 70.

The cup 72 also ensures that the fingers open symmetrically even when the bladder 70 may inflate unevenly because the cup 72 restrains expansion of the bladder so that it cannot extend beyond the inner surface of the cup 72.

The sloped surface 74 provided at the top of the gripper 96 enables the gripper 94 to grasp a part 109 from a carrier 108 in the event that the bladder 70 bursts and fails to open the gripper 96 when the plate 100 approaches the take off plate 107.

Figure 10:
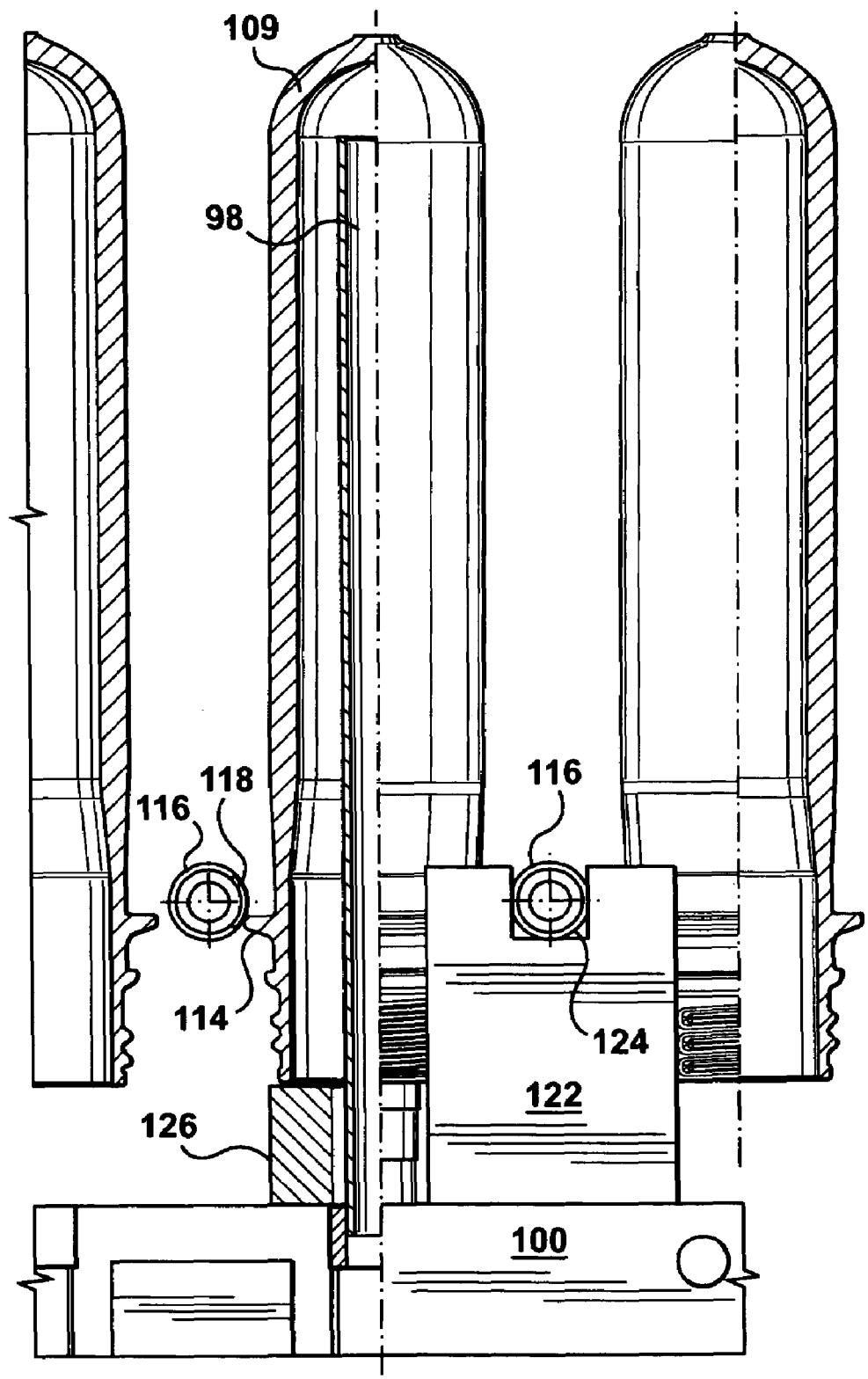
FIG. 10 is a side elevation view in partial section of a third embodiment of a preform gripper mechanism.
Figure 11:
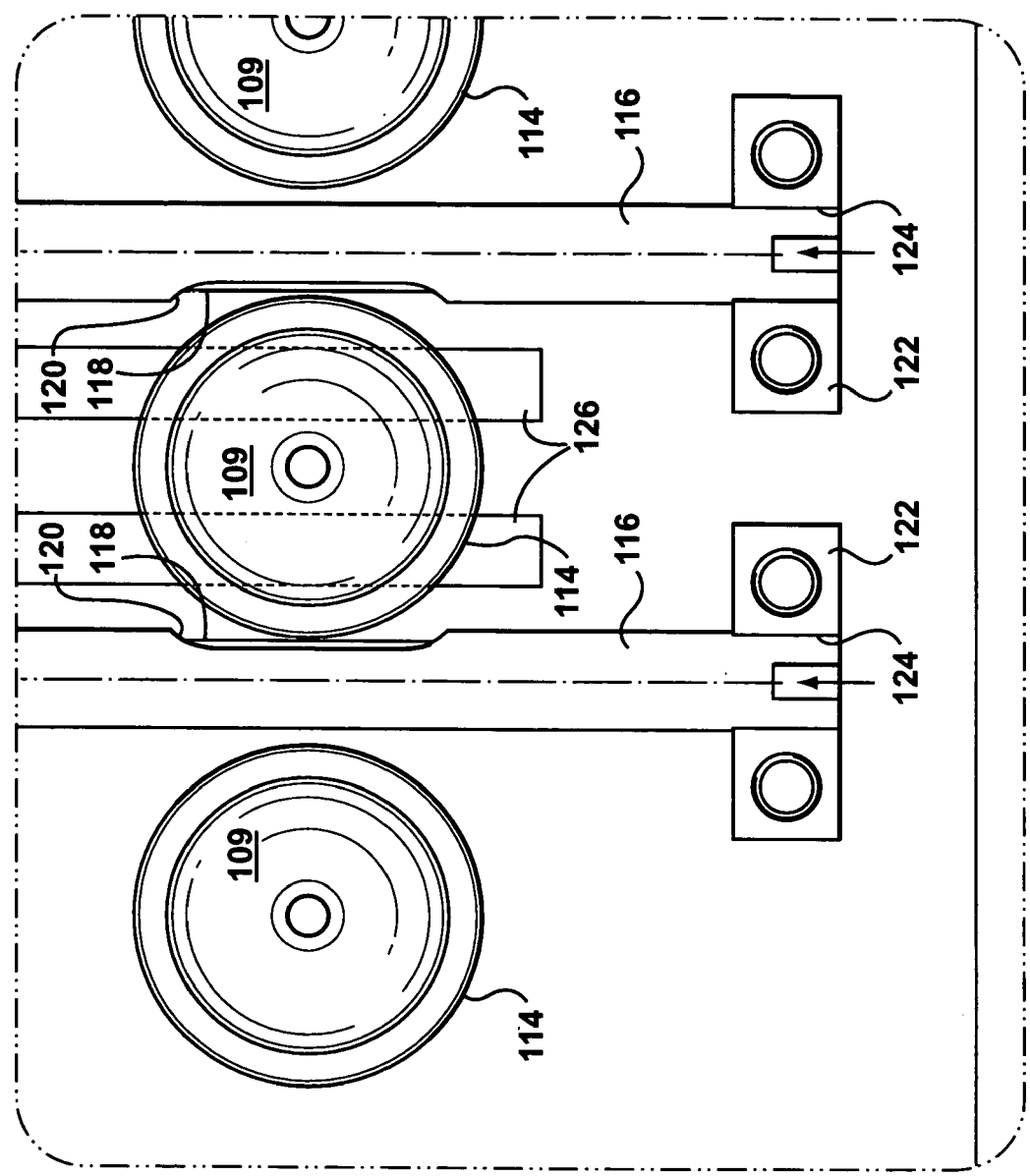
FIG. 11 is a plan view of the third embodiment of gripper mechanism.

FIGS. 10 and 11 show an alternative embodiment for grasping the external surface of parts and removing them from a take-out device. In this embodiment, an aluminum tube 116 extends along both sides of a row of parts 109. The tubes 116 are supported in locating brackets 122 that are bolted to the plate 100. The portions of the tubes 116 within the confines of the blocks 122 are flattened to mate with the flat surfaces in the slots 124 and prevent rotation of the tubes 116. An inflatable tube 118 extends along the interior of the tube 116. At pick off or grasping positions along the tube 116, portions 120 are removed from the aluminum tube wall 116 to expose the inflatable tube 118. To grasp a part 109, air is injected into the inflatable tube 118 and causes the tube 118 to inflate at the cut out portions 120 to grasp the associated part 109. The part 109 can then be carried out of the take out device and transported to a receiving station where it is released by deflating the tube 118.

This embodiment has the advantage that it can be used with parts 109 of different dimensions. To accommodate a wider part the blocks 122 simply have to be positioned farther apart. Thus, new parts are not required to pick new and different parts as the blocks 122 and tubes 116 will be standard for all parts.

In the embodiment shown in FIGS. 10 and 11, the tube 118 engages the ledge 114 of the part 109. To ensure that the tube 118 engages the part reliably the tube 118 is positioned slightly upward of the ledge 114 that it has a tendency to move the part 109 toward the plate 100 rather than away from it thus avoiding the possibility of ejecting the part prematurely. To prevent the preform 109 from misaligning and possibly contacting the cooling tube 98, soft flexible pads 126 are provided. These pads 126 provide a soft support for the preforms 109 and stabilize them so that they remain erect when gripped by the inflatable tube 118.

Figure 12:
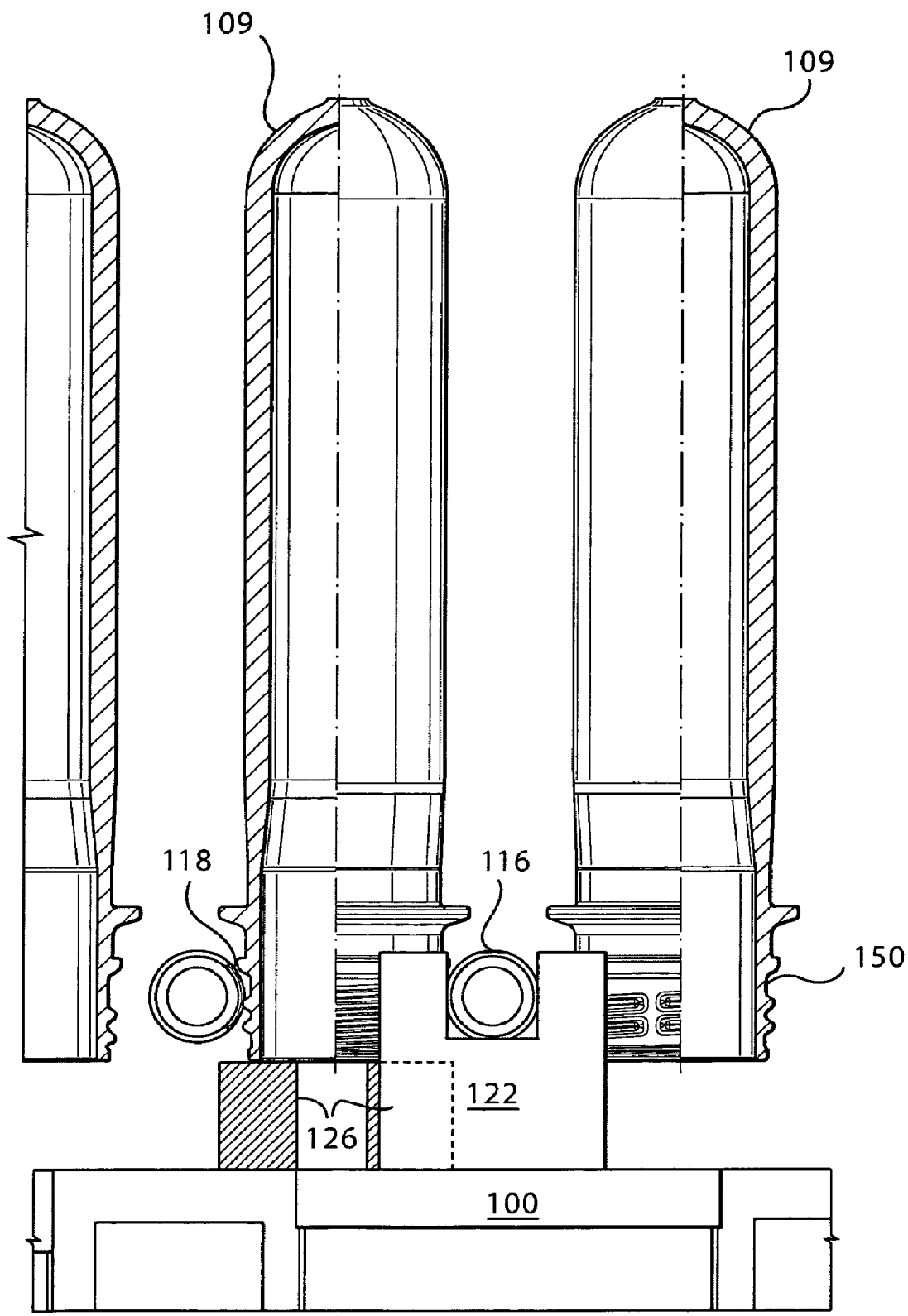
FIG. 12 is side elevation view in partial section of a modification of the third embodiment of gripper mechanism.

The embodiment shown in FIGS. 12 and 13 is essentially the same as the one shown in FIGS. 10 and 11. In this embodiment the tube 118 grasps the threads 150 on the part 109 rather than the ledge 114.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A gripping device for gripping molded preforms, said gripping device comprising:
   a pair of solid tubes, each said tube having a cutout portion at each preform gripping position; and
   an inflatable bladder extending along the interior of each said tube, each said bladder expanding outside said tube at each gripping position when inflated to thereby grasp an outer surface of each preform in each gripping position.

2. In a molded part handling apparatus for an injection molding machine, a cooling device for cooling molded parts carried by a take off device and removing said molded parts from said take off device, said cooling device including:
   a plurality of cooling tubes; and
   a plurality of gripping devices, a gripping position being provided for each part molded during a single molding operation, each said gripping device comprising:
   a pair of solid tubes, each said tube having a cutout portion at each preform gripping position along each tube; and
   an inflatable bladder extending along the interior of each said tube, each said bladder expanding outside said tube at each gripping position when inflated to thereby grasp an outer surface of each preform in each gripping position.

3. In a molded part handling apparatus as defined in claim 1 wherein each said part is a preform having a ledge and a thread and said bladders grip said thread on a preform.

4. In a molded part handling apparatus as defined in claim 1 wherein each said part is a preform having a ledge and a thread and said bladders grip said ledge on a preform.

5. In a molded part handling apparatus as defined in claim 2 wherein each said part is a preform having a ledge and a thread and said bladders grip said thread on a preform.

6. In a molded part handling apparatus as defined in claim 2 wherein each said part is a preform having a ledge and a thread and said bladders grip said ledge on a preform.

7. In a molded part handling apparatus as defined in claim 5 or claim 6 wherein said bladders grip said ledge on a side of said ledge most distant from said thread.

8. A molded part handling apparatus as defined in any one of claims 1 to 6 wherein said tubes are aluminum tubes.

9. A molded part handling apparatus as defined in any one of claims 1 to 6 wherein said tubes include flattened ends mounted in a locating bracket.

10. A molded part handling apparatus as defined in any one of claims 1 to 6 wherein said tubes are aluminum tubes with flattened ends mounted in a locating bracket.

11. A molded part handling apparatus as in claim 7 wherein said tubes are aluminum tubes.

12. A molded part handling apparatus as in claim 7 wherein said tubes include flattened ends mounted in a locating bracket.

13. A molded part handling apparatus as in claim 7 wherein said tubes are aluminum tubes with flattened ends mounted in a locating bracket.

* * * * *